US012141111B1

(12) United States Patent
Darji et al.

(10) Patent No.: US 12,141,111 B1
(45) Date of Patent: Nov. 12, 2024

(54) EQUIVALENCE TESTING VIA PARALLEL OPERATIONS OF LEGACY AND ADAPTED SYSTEMS

(71) Applicant: Amazon Technologies, Inc., Seattle, WA (US)

(72) Inventors: Rohit Darji, Cheam (GB); Kevin Yung, Templestowe (AU); Rashesh Jethi, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/951,788

(22) Filed: Sep. 23, 2022

(51) Int. Cl.
*G06F 16/21* (2019.01)
*G06F 16/23* (2019.01)

(52) U.S. Cl.
CPC ........ *G06F 16/214* (2019.01); *G06F 16/2379* (2019.01)

(58) Field of Classification Search
CPC ............................ G06F 16/214; G06F 16/2379
See application file for complete search history.

(56) References Cited

U.S. PATENT DOCUMENTS

| | | | |
|---|---|---|---|
| 2014/0146055 A1* | 5/2014 | Bala | G06F 8/63 |
| | | | 345/501 |
| 2017/0061027 A1* | 3/2017 | Chesla | G06F 16/955 |
| 2021/0304205 A1* | 9/2021 | Saka | G06F 11/3664 |
| 2022/0114150 A1* | 4/2022 | Saurabh | G06F 16/254 |

* cited by examiner

*Primary Examiner* — Etienne P Leroux
*Assistant Examiner* — Cindy Nguyen
(74) *Attorney, Agent, or Firm* — Lee & Hayes, P.C.

(57) ABSTRACT

Systems and techniques are disclosed for testing the functional equivalence of a legacy system, such as mainframe system, and an adapted system, such as a cloud version of the mainframe system. The same input can be provided to both the legacy system and the adapted system, such that the legacy system and the adapted system can both operate separately on copies of the same input. Results produced by the legacy system and the adapted system based on the same input can accordingly be compared. If results produced by the legacy system and the adapted system over time are determined to be functionally equivalent, the adapted system can be determined to be functionally equivalent to the legacy system.

20 Claims, 8 Drawing Sheets

EQUIVALENCE TESTING VIA PARALLEL OPERATIONS OF LEGACY AND ADAPTED SYSTEMS

BACKGROUND

Entities may use mainframes or other systems to perform various operations. For example, a mainframe may execute one or more types of applications to process payments and other transactions for a business, update database records, and/or perform other types of operations. However, such mainframes and other systems may be legacy systems that are based on relatively old computing hardware, programming languages, and/or technologies, and therefore may be relatively difficult to operate and maintain.

Entities may accordingly want to migrate their operations from such legacy systems to different computing platforms that may be more modern and/or easier to operate and maintain. For example, a business may want to migrate its operations from a legacy mainframe system to a cloud computing platform provided by a service provider.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
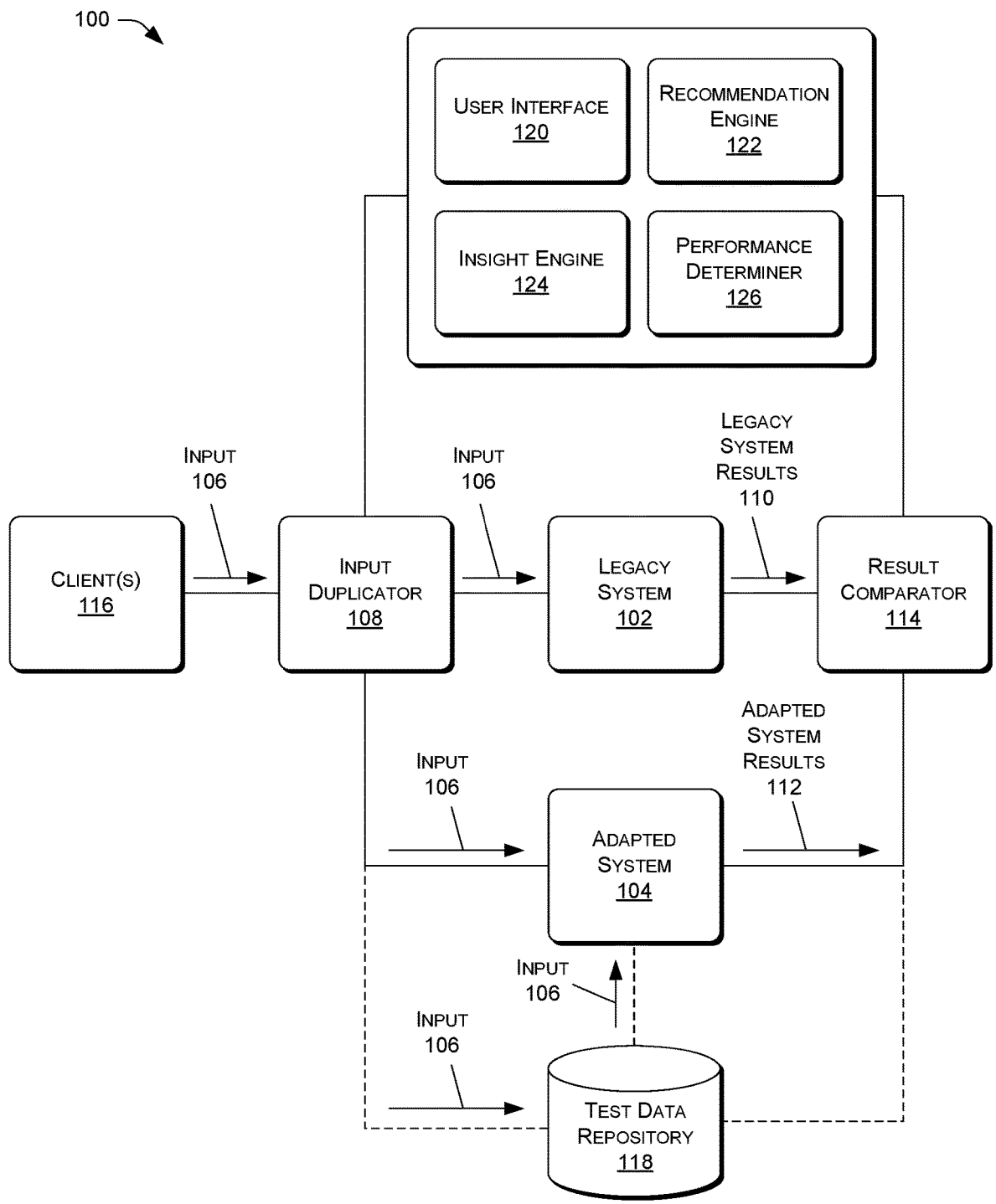
FIG. 1 shows an example of an equivalence testing system in which a legacy system and an adapted system can be executed separately based on the same input, to determine whether the legacy system and the adapted system are functionally equivalent.

A business or other entity may use one or more types of applications to perform operations, such as processing transactions, updating and managing databases, routing messages, and/or other types of operations. In some situations, such an entity may have been using a legacy system to execute such applications over a period of time. However, the entity may want to migrate the entity's operations from the legacy system to a corresponding adapted system, such as a version of the legacy system that has been adapted to run on different computing hardware and/or in a different computing environment.

For example, an entity may have been executing its operations via a legacy mainframe system, such as mainframe system provided by IBM® or another mainframe system provider. However, the entity may want to migrate those operations from being executed by the legacy mainframe system to being executed in a cloud computing environment provided by a service provider. In some examples, the cloud computing environment can execute an emulated version of the legacy mainframe system. In other examples, the cloud computing environment can execute a new cloud-native version of the legacy mainframe system. For instance, if applications executing on the legacy mainframe system were originally written in the COBOL programming language, refactored versions of those applications can be created based on Java® or another newer programming language, such that the refactored versions of the applications can be executed by computing resources of the cloud computing environment.

There may be some differences between a legacy system and an adapted system, such as different computing hardware, a different computing environment, emulated code, refactored code, and/or other differences. However, the adapted system can be intended to be functionally equivalent to the legacy system, such that the adapted system produces the same results from input that the legacy system would produce from the same input.

A migration from the legacy system to an adapted system can be risky in some situations, for instance if the adapted system does not actually produce results that are functionally equivalent to the results that the legacy system would have produced from the same input. As an example, a bank may have been using a legacy mainframe system to perform payment and transfer operations that are critical to the bank's core business. The bank may want to migrate from using the legacy mainframe system to using an adapted system, such as a version of the legacy system that runs in a cloud computing environment in emulated form or via refactored code as described above. However, if the adapted system has bugs or other issues that cause the adapted system to not be fully functionally equivalent to the legacy system, the adapted system may miss payments or transfers, or improperly process payments or transfers, and thereby negatively impact the bank's core business.

Accordingly, an owner or operator of a legacy system may want to perform testing to verify that an adapted system is functionally equivalent to the corresponding legacy system, before the owner or operator moves forward with a migration from the legacy system to the adapted system. For example, if testing confirms that the adapted system produces results that are functionally equivalent to results that the legacy system would produce from the same input, the owner or operator of the legacy system can have confidence that the adapted system is functionally equivalent to the legacy system and that the migration can proceed.

However, it can be difficult, time-consuming, and resource-intensive to develop a suite of test cases that can sufficiently test an adapted system to verify whether the adapted system is functionally equivalent to a corresponding legacy system. For example, developers may need to manually generate thousands of test cases that are designed to test different situations and use cases. Such a manual test case generation process can take a significant amount of time and effort, particularly if the legacy system is configured to execute tens, hundreds, or thousands of different applications that need to be tested with respect to versions of those applications associated with the adapted system. It can also take a significant amount of time and/or computing resources to execute a large manually-generated test suite on both the legacy system and the adapted system, after the test suite has been generated.

Moreover, regardless of the number or quality of such manually-generated test cases, there may still be risks that such manually-generated test cases will not fully cover real-world use cases and situations, such as use cases or situations that may be relatively rare and that are unknown to test developers, but that do occur in the real world from time to time. Accordingly, even if testing results based on such a manually-generated suite of test cases indicate that the adapted system is functionally equivalent to the legacy system, an owner or operator of the legacy system may still be wary of risks that the adapted system may not be fully functionally equivalent to the legacy system, and may therefore still hesitate to approve a migration from the legacy system to the adapted system.

However, described herein is an equivalence testing system that can provide copies of actual real-world input, provided to the legacy system by clients, to the adapted system in addition to the legacy system. Accordingly, the legacy system and the adapted system can both operate on copies of the same real-world input. The equivalence testing system can compare results generated by both the legacy system and the adapted system based on the same input, and thereby determine whether the legacy system and the adapted system are generating functionally equivalent results based on the same input.

In some examples, the equivalence testing system can implement real-time testing by providing copies of the same input to both the legacy system and the adapted system. Accordingly, the legacy system and the adapted system can execute on the same input separately in parallel at the same time or near to the same time, and the equivalence testing system can compare the corresponding results from both systems substantially in real-time as both systems produce the corresponding results. Such real-time testing can reduce overall testing times, as the functional equivalence of the adapted system to the legacy system can be tested substantially immediately when input is provided to both the legacy system and the adapted system and the systems generate corresponding results from the input. In other examples, the equivalence testing system can also, or alternately, implement delayed testing by storing copies of input in a test data repository, so that the copies of the input stored in the test data repository can be used as test cases for later and/or repeated functional equivalence testing of the adapted system.

As described above, the input provided to the adapted system for real-time testing, and/or stored in the test data repository for delayed testing, can be actual real-world input provided to the legacy system by clients. Accordingly, using that real-world input for real-time testing and/or delayed testing as described herein can more accurately and/or more fully test functional equivalence of the adapted system to the legacy system in association with real-world situations and use cases than may be possible via a manually-generated test suite. Accordingly, relative to conventional functional equivalence testing systems, the real-time testing and/or delayed testing described herein can provide an owner or operator of a legacy system with higher confidence levels that a corresponding adapted system is functionally equivalent to the legacy system before migration from the legacy system to the adapted system.

The systems and methods associated with the equivalence testing system described herein may be implemented in a number of ways. Example implementations are provided below with reference to the following figures.

FIG. 1 shows an example of an equivalence testing system 100 in which a legacy system 102 and an adapted system 104 can be executed separately based on the same input 106, to determine whether the legacy system 102 and the adapted system 104 are functionally equivalent. The adapted system 104 can be a copy or version of the legacy system 102 that is intended to produce the same results as the legacy system 102, but that may operate on a different computing platform and/or in a different computing environment than the legacy system 102. In the equivalence testing system 100, an input duplicator 108 can provide copies of the same input 106 to both the legacy system 102 and the adapted system 104. The legacy system 102 can produce legacy system results 110 based on the input 106, while the adapted system 104 can separately produce adapted system results 112 based on the same input 106. A result comparator 114 of the equivalence testing system 100 can compare the legacy system results 110 and the adapted system results 112 produced based on the same input 106, in order to determine whether the legacy system 102 and the adapted system 104 are producing functionally equivalent results based on the same input 106.

The legacy system 102 can, in some examples, be a current production system associated with an entity. For example, an owner or operator of the legacy system 102 may be performing actual business operations, such as operations associated with actual customer data, using, and/or based on, the legacy system results 110 being produced by the legacy system 102. However, the owner or operator of the legacy system 102 may want to migrate or transition to using the adapted system 104 as the production system, instead of the legacy system 102.

However, before engaging in such a migration or transition, the owner or operator of the legacy system 102 may want to verify that the adapted system results 112 produced by the adapted system 104 from instances of input 106 are functionally equivalent to the legacy system results 110 that the legacy system 102 would produce from the same instances of input 106. In some examples, the adapted system results 112 can be considered functionally equivalent to corresponding legacy system results 110 despite differences in one or more types of metadata, operational data, or other types of data that may not impact core functions of legacy system 102 or the adapted system 104, as described in more detail below.

Accordingly, the result comparator 114 can compare legacy system results 110 and adapted system results 112 associated with the same input 106 over a period of time. If the result comparator 114 determines that the legacy system results 110 and the adapted system results 112 associated with the same input 106 are functionally equivalent over the period of time, the owner or operator of the legacy system 102 may have confidence that the legacy system 102 and the adapted system 104 are functionally equivalent. The owner or operator of the legacy system 102 can accordingly choose to migrate or transition operations from the legacy system 102 to the adapted system 104, and thereafter use the adapted system 104 as the production system instead of the legacy system 102.

As discussed above, the adapted system 104 can be a version of the legacy system 102 that is intended to produce the same results as the legacy system 102 in response to the same input 106. The adapted system 104 can, for example, run on a different computing platform and/or in a different computing environment than the legacy system 102. The adapted system 104 can also, or alternately, be based on a different computing language than the legacy system 102 or otherwise have different attributes than the legacy system 102.

In some examples, the adapted system 104 can be an emulated version of the legacy system 102. For instance, the adapted system 104 can be based on the same underlying code as the legacy system 102, but may be executed via emulation on a different computing platform than the legacy system 102.

In other examples, the adapted system 104 can be a re-coded, refactored, or otherwise transformed version of the legacy system 102. For example, the legacy system 102 may be coded using a first programming language, such as COBOL. The adapted system 104 can be a refactored version of the legacy system 102 that is based on a second programming language, such as Java®, that may be newer and/or otherwise different from the first programming language.

As an example, the legacy system 102 may be a mainframe system, and/or execute on a local computing system, in an on-premise computing environment, or on legacy computing hardware. In this example, the adapted system 104 may instead be an emulated version of the legacy system 102, or a newer cloud-native refactored version of the legacy system 102, that operates in a cloud computing environment provided by a service provider.

The legacy system 102 can be configured to receive one or more types of input 106 from one or more clients 116, and to execute one or more types of operations and/or applications based on instances of the input 106. The clients 116 can, for example, be terminals, software applications, websites, web applications, task schedulers, other systems, and/or other types of clients. The input 106 can be messages, instructions, or other types of data provided to the legacy system 102 by one or more clients 116. The input 106 can be real-world data being provided by the clients 116 to the legacy system 102.

The legacy system 102 can execute one or more types of operations based on instances of input 106 received from one or more clients 116, for instance to produce legacy system results 110 that correspond to the instances of input 106. The legacy system 102 can execute the one or more types of operations via one or more applications, subsystems, and/or other elements, to process corresponding types of input 106 and to produce legacy system results 110.

As an example, the legacy system 102 can have a transaction processing system. The transaction processing system can, for example, be a Customer Information Control System (CICS). The transaction processing system of the legacy system 102 can be configured to, based on instances of input 106, process corresponding transactions such as payments, monetary withdrawals, monetary transfers, updates to customer records or other types of records, and/or other types of transactions. In this example, the input 106 can be transaction requests or instructions, and the corresponding legacy system results 110 can indicate transaction status information, transaction success information, transaction failure information, and/or any other type of data indicating how the transaction processing system operated in response to instances of input 106.

As another example, the legacy system 102 can also, or alternately, have a job scheduling system. The job scheduling system can, for example, be based on a Job Control Language (JCL). The job scheduling system can, based on instances of input 106, perform individual jobs, perform batch jobs, initiate subsystems, and/or perform other scheduled operations. For example, one of the clients 116 may be a scheduler that provides an instance of input 106, such as JCL input, that defines a batch job to be performed by the legacy system 102 and/or a schedule indicating when the legacy system 102 is to execute the batch job. The corresponding legacy system results 110 can indicate job status information, job success information, job failure information, and/or any other type of data associated with one or more jobs or operations performed or scheduled by the job scheduling system in response to instances of input 106.

As yet another example, the legacy system 102 can also, or alternately, have a data management system, such as a database management system (DBMS), a file storage system, and/or another system, that manages database records, files, and/or other data stored by the legacy system 102. For example, the legacy system 102 can have a data management system that is based on one or more IBM® systems, such as the DB2 system, the Virtual Storage Access Method (VSAM), and/or the Information Management System (IMS). The clients 116 may provide input 106 that cause the data management system to update database records or files, delete database records or files, create new database records or files, or otherwise access or interact with database records or files. The corresponding legacy system results 110 can be logs or other data that indicate changes to database records or files, summaries of database information, and/or any other data indication how the data management system processed or managed data in response to instances of input 106.

As still another example, the legacy system 102 can also, or alternately, have a message queue, which can store received messages until the messages are forwarded to another destination by the legacy system 102 or are retrieved by another element from the message queue. In this example, input 106 provided by one or more clients 116 can be messages that the legacy system 102 adds to the message queue. The corresponding legacy system results 110 can be logs or other data that indicate how many messages are in the message queue, when messages were added and/or removed from the message queue, copies of outgoing messages passing out of the message queue, and/or any other data indicating how the message queue responded to instances of input 106.

The legacy system 102 can also, or alternately, have one or more other types of applications, subsystems, or other elements. For example, the legacy system 102 can have or execute File Transfer Protocol (FTP) systems, email systems, printing systems and/or other output manager systems, systems for Simple Object Access Protocol (SOAP) Application Programming Interfaces (APIs), Representational State Transfer (REST) APIs, and/or other web services, systems for Transmission Control Protocol/Internet Protocol (TCP/IP) connections and/or other types of connections, z/OS® Connect systems, IMS Connect systems, other APIs, and/or other types of elements.

The adapted system 104 can also have versions of one or more of the applications, subsystems, or other elements of the legacy system 102, such as the transaction processing system, the job scheduling system, the data management system, and/or the message queue described above. The adapted system 104 can also, or alternately, have versions of other elements of the legacy system 102, such as FTP systems, email systems, printing systems and/or other output manager systems, systems for SOAP APIs, REST APIs, and/or other web services, systems for TCP/IP connections and/or other types of connections, z/OS® Connect systems, IMS Connect systems, other APIs, and/or any other applications, subsystems, or other elements of the legacy system 102 as described above. The versions of such applications, subsystems, or other elements in the adapted system 104 can be intended to produce adapted system results 112 that are functionally equivalent to the legacy system results 110 that the versions of the applications, subsystems, or other elements of the legacy system 102 would produce based on the same input 106.

For example, the adapted system 104 can also have a transaction processing system configured to receive input 106 such as transaction requests or instructions, execute transactions based on the input, and produce corresponding adapted system results 112 that indicate transaction status information, transaction success information, transaction failure information, and/or any other type of data indicating how the transaction processing system operated in response to the input 106. As another example, the adapted system 104 can also or alternately have a job scheduling system configured to receive input 106 such as job scheduling information, execute the jobs, and produce corresponding adapted system results 112 that indicate job status information, job success information, job failure information, and/or any other type of data associated with one or more jobs or operations performed or scheduled by the job scheduling system in response to the input 106. As yet another example, the adapted system 104 can also or alternately have a data management system configured to receive input 106 that causes the data management system to access or interact with database records or files, and to produce corresponding adapted system results 112 that indicate changes to database records or files, summaries of database information, and/or any other data indication how the data management system processed or managed data in response to the input 106. As still another example, the adapted system 104 can also or alternately have a message queue configured to receive input 106 such as messages to be added to the message queue, and to produce corresponding adapted system results 112 that indicate how many messages are in the message queue, when messages were added and/or removed from the message queue, and/or any other data indicating how the message queue responded to instances of input 106.

The input duplicator 108 can be configured to intercept, receive, or otherwise identify and/or access instances of input 106 provided by clients 116, and cause copies of individual instances of input 106 to be provided to both the legacy system 102 and the adapted system 104. The input duplicator 108 can, in some examples, provide copies of input to the legacy system 102 and/or the adapted system 104 via the Internet and/or other network or data connections. Accordingly, both the legacy system 102 and the adapted system 104 can separately operate on different copies of individual instances of input 106, and separately produce corresponding legacy system results 110 and adapted system results 112 based on copies of the same input 106. The result comparator 114 can compare the legacy system results 110 and the adapted system results 112 produced based on the same input 106, as discussed further below.

In some examples, the input duplicator 108 can provide copies of input 106 to the adapted system 104 substantially immediately after identifying the input 106. For example, the input duplicator 108 can be configured to send a copy of input 106 to the adapted system 104 via a network within 100 milliseconds, or any other higher or lower threshold period of time, after receiving or identifying the input 106.

If the input 106 has not already been received by the legacy system 102, the input duplicator 108 can also provide a copy of the input 106 to the legacy system 102. Accordingly, the legacy system 102 and the adapted system 104 can receive copies of the same input 106 at the same time, or within a threshold period of time, such that the legacy system 102 and the adapted system 104 can operate on the same input at or near the same time.

The input duplicator 108 can, in some examples, have a set of different input handlers associated with different types of clients 116, different types of input 106, and/or different types of applications or systems executed by the legacy system 102. For instance, the input duplicator 108 can have different input handlers associated with a transaction processing system, a job scheduling system, a data management system, a message queue, an FTP system, an email system, an output manager system, one or more web service systems, a TCP/IP system, APIs, and/or other applications, subsystems, or other elements of the legacy system 102. Different input handlers of the input duplicator 108 can be configured differently, as discussed further below. As an example, a first input handler associated with a transaction processing system may be configured to provide copies of input 106 associated with the transaction processing system to instances or versions of the transaction processing system executing in the legacy system 102 and the adapted system 104, but a second input handler associated with a job scheduling system may be configured to provide copies of input 106 associated with the job scheduling system only to an instance or version of the job scheduling system executing in the legacy system 102 and not to the adapted system 104.

In some examples, the input duplicator 108 can be executed as a middleware component or via a network element that is positioned in a communication path between the clients 116 and the legacy system 102. The input duplicator 108 can accordingly intercept incoming input 106, copy the incoming input 106, and pass copies of the input 106 to both the legacy system 102 and the adapted system 104. For example, the input duplicator 108 may execute on a firewall or other network element that the input 106 passes through, such that the input duplicator 108 can intercept the input 106 and provide copies of the input 106 to both the legacy system 102 and the adapted system 104.

In other examples, the input duplicator 108 may be executed as part of the legacy system 102. For example, if the legacy system 102 is a mainframe system, the input duplicator 108 may operate on the mainframe system to access and/or identify input 106 provided to the mainframe system, and to send copies of that input 106 to the adapted system 104. In these examples, the mainframe system may be configured to use primary processors of the mainframe system to execute one or more applications to process the input 106 and generate the legacy system results 110. However, the input duplicator 108 may execute as a Java® application, or other type of application, on one or more different or secondary processors of the mainframe system, such as a System z Integrated Information Processor (zIIP), in order to avoid negatively impacting the ability of the primary processors to process the input 106 via one or more applications.

Although the input duplicator 108 is described herein as, in some examples, providing copies of the same input 106 to both the legacy system 102 and the adapted system 104, the input duplicator 108 can provide copies of the input 106 to both systems by identifying input 106 that has already been provided by one or more clients 116 to the legacy system 102, replicating the input 106, and providing the replicated input 106 to the adapted system 104. For example, if the legacy system 102 is a mainframe system, and the input duplicator 108 operates on the mainframe system as described above, the input duplicator 108 may identify or trace instances of input 106 already received by the mainframe system, and provide copies of those instances of input 106 to the adapted system 104. Accordingly, in such examples, the input duplicator 108 can provide copies of the same input 106 to both the legacy system 102 and the adapted system 104 by replicating input 106 already received by the legacy system 102 and transmitting the replicated input 106 to the adapted system 104. In other examples, as described above, the input duplicator 108 may intercept incoming input 106 before the input 106 is received by the legacy system 102, copying the input 106, and providing copies of the input 106 to both the legacy system 102 and the adapted system 104.

The result comparator 114 can receive or access legacy system results 110 and corresponding adapted system results 112 that are respectively produced by the legacy system 102 and the adapted system 104 based on the same input 106. As an example, the legacy system results 110 and the adapted system results 112 can be logs maintained by the legacy system 102 and the adapted system 104, which indicate how the legacy system 102 and the adapted system 104 responded to corresponding instances of input 106. The result comparator 114 can use one or more APIs or other interfaces to issue requests to the legacy system 102 and the adapted system 104 to retrieve such logs, or may be configured to directly access directories or other data repositories in which such logs are stored. As another example, the result comparator 114 can access or intercept outgoing messages generated and/or sent by the legacy system 102 and the adapted system 104 in association with corresponding instances of input 106, and the result comparator 114 can use such outgoing messages as legacy system results 110 and adapted system results 112.

In some examples, the result comparator 114 can execute on computing hardware or computing resources associated with the legacy system 102. For instance, if the legacy system 102 is a mainframe system, the result comparator 114 can execute on the mainframe system, for example via a zIIP or one or more other secondary processors to avoid negatively impacting performance of other applications executing via main processors of the mainframe system. In other examples, the result comparator 114 can execute as a middleware component and/or on a network element, such as a firewall, that has access to the legacy system results 110 and the adapted system results 112. In still other examples, the result comparator 114 can execute in another computing environment, such as a cloud computing environment, that may be the same as, or different from, the computing environment associated with the adapted system 104. For example, the result comparator 114 can execute in a cloud computing environment, but be configured to access legacy system results 110 from a mainframe system or other legacy system 102 and to also access adapted system results 112 from the adapted system 104 associated with the same cloud computing environment or a different computing environment.

The result comparator 114 can perform comparison operations on legacy system results 110 and adapted system results 112 associated with the same input 106, to determine if the legacy system results 110 and the adapted system results 112 are functionally equivalent. In some examples, configuration data associated with the result comparator 114 can indicate a definition of functionally equivalent results, for instance by indicating how or when legacy system results 110 and adapted system results 112 can be determined to be functionally equivalent by the result comparator 114. For example, the configuration data may indicate that legacy system results 110 and adapted system results 112 can be considered to be functionally equivalent if one or more specific elements, fields, values, or other attributes of the legacy system results 110 and adapted system results 112 are identical.

In some examples, the configuration data may indicate that legacy system results 110 and adapted system results 112 can be considered to be functionally equivalent even if the legacy system results 110 and the adapted system results 112 are not an exact match, such as if timestamps, metadata, and/or operational data that may not impact core functionality of the legacy system 102 and/or adapted system 104 are different between the legacy system results 110 and the adapted system results 112. For instance, configuration data may indicate that one or more data elements, fields, values, or other attributes of legacy system results 110 and adapted system results 112 are not to be compared by the result comparator 114, do not have to match exactly for the legacy system results 110 and the adapted system results 112 to be considered functionally equivalent by the result comparator 114, or can vary by up to defined threshold tolerance levels for the legacy system results 110 and the adapted system results 112 to be considered functionally equivalent by the result comparator 114.

As an example, the legacy system 102 and the adapted system 104 may process copies of the same input 106 at slightly different times. For instance, if the adapted system 104 is running on a remote server in a cloud computing environment, it may take longer for the adapted system 104 to receive the input 106 over a network relative to when the legacy system 102 receives the same input 106. Accordingly, the configuration data may indicate that the result comparator 114 can disregard differences between timestamp fields of the legacy system results 110 and the adapted system results 112, which may indicate when the legacy system 102 and the adapted system 104 processed the input 106 and/or produced the legacy system results 110 and the adapted system results 112. The configuration data may thus indicate that the result comparator 114 can consider the legacy system results 110 and the adapted system results 112 to be functionally equivalent in this example if the legacy system results 110 and the adapted system results 112 are otherwise identical, aside from the timestamp fields.

As another example, due to differences in processing power or other computing resources available to the legacy system 102 and the adapted system 104, or other differences between the legacy system 102 and the adapted system 104, the legacy system 102 and the adapted system 104 may take different amounts of time to perform the same operations in association with the same input 106. The legacy system results 110 and the adapted system results 112 may include processing time information indicating how long the legacy system 102 and the adapted system 104 took, respectively, to process the same input 106. In this example, the configuration data may indicate that the result comparator 114 can consider the legacy system results 110 and the adapted system results 112 to be functionally equivalent if a difference between the processing time information in the legacy system results 110 and the adapted system results 112 is less than a threshold time difference, and/or if the processing time information in the legacy system results 110 and the adapted system results 112 are both less than a maximum allowable processing time threshold.

The result comparator 114 can accordingly determine whether legacy system results 110 and adapted system results 112 associated with the same input 106 are functionally equivalent. The result comparator 114 can also track and/or identify individual pairs of corresponding legacy system results 110 and adapted system results 112 that are or are not functionally equivalent, determine metrics associated with how many pairs of corresponding legacy system results 110 and adapted system results 112 are or are not determined to be functionally equivalent over a period of time, and/or determine other information associated with the comparisons between legacy system results 110 and corresponding adapted system results 112.

As described above, the input duplicator 108 cause copies of the same input 106 to be provided to both the legacy system 102 and the adapted system 104 at the same time, or within a threshold period of time. In some examples, the legacy system 102 and the adapted system 104 can operate on the same input 106 separately, in parallel and/or at or near the same time, to produce corresponding legacy system results 110 and adapted system results 112 based on the same input 106. The result comparator 114 can compare the corresponding legacy system results 110 and adapted system results 112 substantially immediately after the legacy system results 110 and adapted system results 112 are produced, or within a threshold amount of time after the result comparator 114 obtains the legacy system results 110 and adapted system results 112.

Accordingly, the result comparator 114 can determine whether the legacy system 102 and the adapted system 104 are producing functionally equivalent results from the same input 106 substantially in real-time, or within a threshold amount of time after the input 106 is received and/or operations of the legacy system 102 and the adapted system 104. The input 106 can be real-world data being provided by clients 116 to the legacy system 102. By providing copies of that input 106 to the adapted system 104 as well as to the legacy system 102, the adapted system 104 can be tested alongside the legacy system 102 substantially in real-time based on actual real-world data to determine whether the adapted system 104 and the legacy system 102 produce functionally equivalent results based on the same input 106. Although both the legacy system 102 and the adapted system 104 may operate on copies of the same input 106, the legacy system 102 can be used as the production system until comparisons performed by the result comparator 114 confirm that the legacy system 102 and the adapted system 104 are producing functionally equivalent results, and a decision is made to transition to using the adapted system 104 as the production system instead of the legacy system 102.

Although the input duplicator 108 can cause the adapted system 104 to be tested on actual input 106 alongside the legacy system 102 substantially in real-time as described above, in some examples the input duplicator 108 can also or alternately cause the adapted system 104 to be tested and/or re-tested at later times based on copies of the input 106. For example, the input duplicator 108 can provide input 106 to the legacy system 102, but store copies of the input 106 in a test data repository 118 instead of, or in addition to, providing copies of the input to the adapted system 104. In some other examples, the adapted system 104 can receive copies of the input 106 from the input duplicator 108, but store those copies of the input 106 in the test data repository 118 instead of, or in addition to, processing the copies of the input 106.

The test data repository 118 can be a database or other data store of instances of input 106, which can be provided to the adapted system 104 at one or more times to test the adapted system 104. In some examples, the test data repository 118 can be a component or element that is associated with the adapted system 104. For example, if the adapted system 104 executes in a cloud computing environment, the test data repository 118 may also be hosted in the cloud computing environment. The adapted system 104 may process instances of input 106, stored in the test data repository 118, during tests at different times than the legacy system 102 operates on copies of those instances of input 106.

As an example, the input duplicator 108 can receive an instance of input 106 from a client. The input duplicator 108 can provide a first copy of the input 106 to the legacy system 102 at a first point in time, such that the legacy system 102 can process the first copy of the input 106 and produce corresponding legacy system results 110 at or around the first point in time. However, at the first point in time, the input duplicator 108 can also store a second copy of the input 106 in the test data repository 118. At a second, later, point in time, the second copy of the input 106 can be provided to the adapted system 104 from the test data repository 118, and the adapted system 104 can process the second copy of the input 106 to produce corresponding adapted system results 112 at or around the second point in time. Accordingly, around the second point in time, the result comparator 114 can compare the legacy system results 110 generated by the legacy system 102 around the first point in time against the adapted system results 112 generated by the adapted system 104 around the second point in time, to determine whether the legacy system results 110 and the adapted system results 112 are functionally equivalent.

In some examples, the result comparator 114 may obtain previously-generated legacy system results 110, and store the legacy system results 110 in the test data repository 118 or another storage location at least until the result comparator 114 obtains corresponding later-generated adapted system results 112 that are to be compared against the legacy system results 110. The result comparator 114 can accordingly retrieve the previously-generated legacy system results 110 that correspond to the later-generated adapted system results 112, and compare the previously-generated legacy system results 110 and the later-generated adapted system results 112.

In other examples, during a test, copies of the same input 106 can be provided to both the legacy system 102 and the adapted system 104 from the test data repository 118. Accordingly, the legacy system 102 and the adapted system 104 can both operate on the same input 106 from the test data repository 118 at substantially the same time in association with the test, and the result comparator 114 can compare legacy system results 110 and corresponding adapted system results 112 that are produced at substantially the same time. In these examples, the legacy system 102 may already have processed a copy of the input 106 and generated legacy system results 110 that were used in production and not as part of the test, but the legacy system 102 may re-process the new copy of the input 106 to generate new non-production legacy system results 110 for test purposes that can be compared against the newly-generated adapted system results 112.

By storing copies of input 106 in the test data repository 118, copies of the input 106 can be used to test or re-test the adapted system 104 at one or more times as part of delayed testing, in order to determine whether the adapted system 104 can produce adapted system results 112 that are functionally equivalent to corresponding legacy system results 110. As discussed above, copies of input 106 can also or alternately be provided to both the legacy system 102 and the adapted system 104 substantially simultaneously, such as within a threshold period of time, to perform real-time tests of the adapted system 104 relative to the legacy system 102.

In some examples, the equivalence testing system 100 can be configured to perform real-time testing in some situations and/or with respect to one or more applications, and perform delayed testing in other situations and/or with respect to other applications. For example, when one or more elements of the adapted system 104 are under development and may have, or be expected to have, bugs that prevent the adapted system 104 from producing adapted system results 112 that are functionally equivalent to corresponding legacy system results 110, the input duplicator 108 can be configured to store copies of input 106 being provided to the legacy system 102 in the test data repository 118. The stored copies of the input 106 in the test data repository 118, representing actual data received from clients 116, can be used later to perform tests on the adapted system 104 that may assist developers in identifying bugs, fixing bugs, and/or otherwise further developing the adapted system 104. Accordingly, delayed testing can be performed on the adapted system 104 based on input 106 stored in the test data repository 118 until the adapted system 104 has been developed further and may be more likely to be able to generate adapted system results 112 that are functionally equivalent to corresponding legacy system results 110.

At a later time, once bugs with the adapted system 104 have been fixed, and/or developers believe that the adapted system 104 may be more likely to produce functionally equivalent results, the input duplicator 108 can be re-configured to provide copies of input 106 to both the legacy system 102 and the adapted system 104 at substantially the same time. Accordingly, the adapted system 104 can be tested in real-time alongside the legacy system 102 based on the same input 106. If comparisons performed by the result comparator 114 in association with such real-time testing indicate that that legacy system results 110 and the adapted system results 112 are not functionally equivalent, further debugging or development of the adapted system 104 can be performed, and further real-time and/or delayed testing of the adapted system 104 can be performed via the equivalence testing system 100.

As shown in FIG. 1, the equivalence testing system 100 can also have one or additional components, such as a user interface 120, a recommendation engine 122, an insight engine 124, and/or a performance determiner 126. Such components of the equivalence testing system 100 may be hosted on, and/or can be provided by, a cloud computing platform and/or other computing platforms, such as one or more computing platforms associated with the input duplicator 108, the result comparator 114, the adapted system 104, and/or the test data repository 118. For example, if the result comparator 114 executes in a cloud computing environment, one or more portions of the user interface 120 associated with the result comparator 114 can be hosted by a computing resource of the cloud computing environment. As another example, if the input duplicator 108 executes on a firewall or other network element in a communication path between clients 116 and the legacy system 102, one or more portions of the user interface 120 associated with the input duplicator 108 can be hosted by the firewall or network element, or a separate computing resource that hosts the user interface 120 can interact with the input duplicator 108 by exchanging data with the network element that executes the input duplicator 108.

The user interface 120 can be a graphical user interface, a text-based user interface, or other types of user interface that provides user-selectable options to configure the input duplicator 108 and/or the result comparator 114, allow users to view results of comparisons performed by the result comparator 114, allow users to provide instructions associated with real-time tests and/or delayed tests of the adapted system 104, and/or otherwise interact with the equivalence testing system 100. Examples of the user interface 120 are shown and described further below with respect to FIG. 2 and FIG. 3.

The user interface 120 can allow users to configure the input duplicator 108, as described further below with respect to FIG. 2. For example, the user interface 120 can allow users to configure the input duplicator 108 to provide copies of input 106 to both the legacy system 102 and the adapted system 104 in association with real-time testing, and/or to store copies of input in the test data repository 118 for later use during delayed testing. The user interface 120 may also allow users to define delayed tests to be executed and/or scheduled for later execution, for instance by selecting types of stored input 106 and/or specific sets of stored input 106 to be provided to the adapted system 104 during the delayed tests. In some examples, the user interface 120 can allow users to determine which types of input 106 to provide to the legacy system 102, the adapted system 104, and/or the test data repository 118 in association with real-time tests and/or delayed tests. The user interface 120 may, for instance, provide options to configure the input duplicator 108 differently with respect to different types of applications, input 106, and/or clients 116.

As a first example, if the legacy system 102 has both a transaction processing system and a data management system as described above, a user may only want to test a version of the transaction processing system in the adapted system 104. Accordingly, the user can use the user interface 120 to configure the input duplicator 108 to provide copies of input 106 associated with the transaction processing system to both the legacy system 102 and to the adapted system 104, but to provide input 106 associated with the data management system only to the legacy system 102.

As a second example, a user may use the user interface 120 to configure the input duplicator 108 to provide copies of input 106 associated with a first application to both the legacy system 102 and to the adapted system 104 for real-time testing. However, the user may use the user interface 120 to configure the input duplicator 108 to provide copies of input 106 associated with a second application to the legacy system 102 and to the test data repository 118, for later delayed testing of the adapted system 104 with respect to the second application.

As a third example, a particular application may already have been fully migrated to the adapted system 104 from the legacy system 102, such that the production version of the third application is running via the adapted system 104. However, production versions of other applications may still be running on the legacy system 102. Accordingly, a user may use the user interface 120 to configure the input duplicator 108 to route input 106 associated with the particular application only to the adapted system 104, but to provide copies of input 106 associated with the other applications to the legacy system 102 and to zero, one, or both of the adapted system 104 or the test data repository 118.

The user interface 120 can also allow users to configure the result comparator 114 and/or view other information associated with the result comparator 114, as described further below with respect to FIG. 3. For example, as described above, configuration data associated with the result comparator 114 can indicate whether the result comparator 114 can consider legacy system results 110 and adapted system results 112 to be functionally equivalent. The user interface 120 can accordingly allow users to provide or adjust definitions of functional equivalence. As an example, a user can use the user interface 120 to define which data elements or fields of legacy system results 110 and corresponding adapted system results 112 must be identical, or can be disregarded and not considered during comparisons, for the legacy system results 110 and adapted system results 112 to be considered functionally equivalent. As another example, a user can use the user interface 120 to provide or adjust threshold tolerance levels associated with differences between data elements or fields of legacy system results 110 and corresponding adapted system results 112, such that the legacy system results 110 and the adapted system results 112 can be considered functionally equivalent if those data elements or fields are different but vary by differences that are less than or equal to corresponding threshold tolerance levels.

The user interface 120 can additionally present information associated with comparisons of legacy system results 110 and adapted system results 112 performed by the result comparator 114. For example, the user interface 120 may display comparison results associated with pairs of legacy system results 110 and adapted system results 112, or sets of corresponding legacy system results 110 and adapted system results 112. The user interface 120 may allow users to select specific legacy system results 110 and adapted system results 112, for instance to view additional information that may indicate why the selected legacy system results 110 and adapted system results 112 were, or were not, found to be functionally equivalent by the result comparator 114. As another example, the user interface 120 may present a percentage of adapted system results 112 that have been found by the result comparator 114 to be functionally equivalent to corresponding legacy system results 110 over a period of time.

The user interface 120 may also allow users to define goals for comparisons of legacy system results 110 and adapted system results 112 over a period of time, and may present comparison results associated with periods of time relative to corresponding goals. As an example, a user associated with a business may want to confirm that the adapted system 104 is fully functionally equivalent to the legacy system 102 over a three-month period before the business migrates its operations from the legacy system 102 to the adapted system 104. Accordingly, the user may use the user interface 120 to define a goal of the adapted system results 112 produced by the adapted system 104 during real-time testing over the three-month period being 100% functionally equivalent to corresponding legacy system results 110 produced by the adapted system 104 over the same three-month period. The user interface 120 can display progress information indicating how many days, during the three-month period, the adapted system results 112 have been found to be 100% functionally equivalent to corresponding legacy system results 110. Alternatively, the user interface 120 can display such progress information indicating how long adapted system results 112 have been found to be 100% functionally equivalent to corresponding legacy system results 110, or any other comparison results, without associating that information with a user-defined goal.

In some examples, a user may use information displayed via the user interface 120 to determine when configuration data associated with the result comparator 114 can or should be adjusted. For example, the result comparator 114 may initially be configured to determine that adapted system results 112 are functionally equivalent to legacy system results 110 if the adapted system results 112 and the legacy system results 110 are an exact match. However, the user interface 120 may indicate that most or all of the legacy system results 110 and the corresponding adapted system results 112 compared by the result comparator 114 over time are not an exact match. The user may view information associated with the legacy system results 110 and the corresponding adapted system results 112 via the user interface 120, and determine that, for most pairs of legacy system results 110 and adapted system results 112, the legacy system results 110 and adapted system results 112 are identical aside from timestamp differences. The user can accordingly use the user interface 120 to adjust the configuration of the result comparator 114 to disregard differences in timestamp fields of the legacy system results 110 and adapted system results 112, or to consider the legacy system results 110 and adapted system results 112 to be functionally equivalent if differences in the timestamp fields are less than a tolerable difference threshold set by the user.

Although the equivalence testing system 100 can have the user interface 120 as discussed above, the equivalence testing system 100 can also, or alternately, have an API or other interface that allows users to access comparison results, configure the input duplicator 108 and/or the result comparator 114, and/or otherwise interact with elements of the equivalence testing system 100. For example, the equivalence testing system 100 can have an API that allows users of other systems to upload new pre-prepared configuration files for the input duplicator 108 and/or the result comparator 114, instead of or in addition to users using the user interface 120 to adjust the configurations of the input duplicator 108 and/or the result comparator 114. As another example, the equivalence testing system 100 can have an API that allows users of other systems to retrieve data logs of comparison results determined by the result comparator 114, instead of or in addition to users using the user interface 120 to view information associated with such comparison results.

The equivalence testing system 100 can also, in some examples, automatically generate configuration recommendations and/or insights based on real-time and/or delayed testing of the adapted system 104 and corresponding comparisons between legacy system results 110 and adapted system results 112. Such configuration recommendations and/or insights can be presented via the user interface 120.

For example, the equivalence testing system 100 may have, or be associated with, the recommendation engine 122 shown in FIG. 1. The recommendation engine 122 can have been trained, via supervised or unsupervised machine learning, on a training set of previous legacy system results 110 and adapted system results 112 associated with the same or different legacy and adapted systems, to predict which types of differences between legacy system results 110 and adapted system results 112 are relevant and/or not relevant to determining whether the legacy system results 110 and the adapted system results 112 are functionally equivalent. Accordingly, the recommendation engine 122 may determine that although the result comparator 114 is determining that legacy system results 110 and adapted system results 112 are not functionally equivalent based on a current configuration, types of differences between those legacy system results 110 and adapted system results 112 are not likely to be relevant to whether the legacy system results 110 and adapted system results 112 are functionally equivalent. The recommendation engine 122 may present, via the user interface 120, a recommendation to adjust the configuration of the result comparator 114 to disregard those types of differences, or a recommendation on how to adjust tolerable thresholds associated with those types of differences.

As another example, the equivalence testing system 100 may have, or be associated with, the insight engine 124 shown in FIG. 1. The insight engine 124 can be a trained machine learning system, or a rules-based system, that can automatically identify portions of code of the adapted system 104 that may be leading to differences between adapted system results 112 and corresponding legacy system results 110. Accordingly, the insight engine 124 may present information, via the user interface 120, indicating that bugs or other issues may exist with those portions of code of the adapted system 104, which may assist developers in identifying and fixing such bugs or issues so that future adapted system results 112 generated by the adapted system 104 can be more likely to be functionally equivalent to legacy system results 110.

The equivalence testing system 100 can also, in some examples, automatically determine performance metrics associated with the legacy system 102 and/or the adapted system 104 operating on input 106, and/or compare such performance metrics. For example, the equivalence testing system 100 may have, or be associated with, the performance determiner 126 shown in FIG. 1. The performance determiner 126 can be configured to determine performance metrics, such as processing times, processor usage, memory usage, power usage, and/or other usage levels associated with computing resources or other types of resources, associated with operations performed by the legacy system 102 and the adapted system 104 to process corresponding input 106. The performance determiner 126, or the result comparator 114, can also compares such performance metrics to determine whether the legacy system 102 and the adapted system 104 are using similar amounts of resources to process the same input 106, or whether one of the legacy system 102 and the adapted system 104 is more efficient than the other at processing the same input 106. Results of such performance metric comparisons can be presented via the user interface 120. Accordingly, if the performance determiner 126 determines the adapted system 104 is using more resources than the legacy system 102 to process the same input 106, a user may want to optimize the adapted system 104 further before migrating from the legacy system 102 to the adapted system 104, even if the adapted system 104 and the legacy system 102 are producing functionally equivalent results.

In some examples, there may be different instances of the adapted system 104. For example, a test instance of the adapted system 104 may execute on a first server or cloud computing resource, while a production instance of the adapted system 104 may execute on a second server or cloud computing resource. The test instance of the adapted system 104 may be identical to the production instance of the adapted system 104, but be set up for functional equivalence testing and/or other testing. In this example, the input duplicator 108 can be configured to provide copies of input 106 to the test instance of the adapted system 104. If the result comparator 114 determines that adapted system results 112 generated by the test instance of the adapted system 104 are functionally equivalent to the legacy system results 110 generated by the legacy system 102 based on the same input 106 as described herein, a migration process can be initiated such that future input 106 is provided to the production instance of the adapted system 104 instead of the legacy system 102 and/or the test instance of the adapted system 104.

Overall, by providing the same real-world input 106 to the adapted system 104 that is being provided to the legacy system 102, in real-time and/or on a delayed basis, adapted system results 112 generated from that input 106 by the adapted system 104 can be directly compared to corresponding legacy system results 110 that the legacy system 102 separately generates from that input 106. The result comparator 114 can determine whether the adapted system results 112 are functionally equivalent to the corresponding legacy system results 110.

If the result comparator 114 determines that a set of adapted system results 112, generated by the adapted system 104 over a period of time and/or based on a set of instances of input 106, is functionally equivalent to a corresponding set of legacy system results 110 generated by the legacy system 102, an owner or operator of the legacy system 102 may have a high confidence level that the adapted system 104 is functionally equivalent to the legacy system 102. For example, because the input 106 is real-world input 106 provided by clients 116 to the legacy system 102 for production purposes, the owner or operator of the legacy system 102 can have confidence that the adapted system 104 has been tested for functional equivalence based on actual input 106 that reflects real-world scenarios and use cases.

Testing the adapted system 104 based on such real-world input 106 received from clients 116 can also reduce or avoid the time, expense, effort, and usage of computing resources that may otherwise be needed to manually create a set of test cases for functional equivalence testing. For example, it may take a significant amount of time for developers to manually generate a set of functional equivalence test cases via computing devices, and such computing devices may use memory, processing cycles, bandwidth, and/or other types of computing resources as the developers create the functional equivalence test cases. However, by performing functional equivalence testing the adapted system 104 based on real-world input 106 received from clients 116 as described herein, instead of having developers manually create functional equivalence test cases, overall usage of such computing resources can be reduced. Testing the adapted system 104 based on real-world input 106 received from clients 116, instead of based on manually-created test cases, may also more accurately, and/or more thoroughly, test the adapted system 104 for functional equivalence to the legacy system 102, as discussed above.

Figure 2:
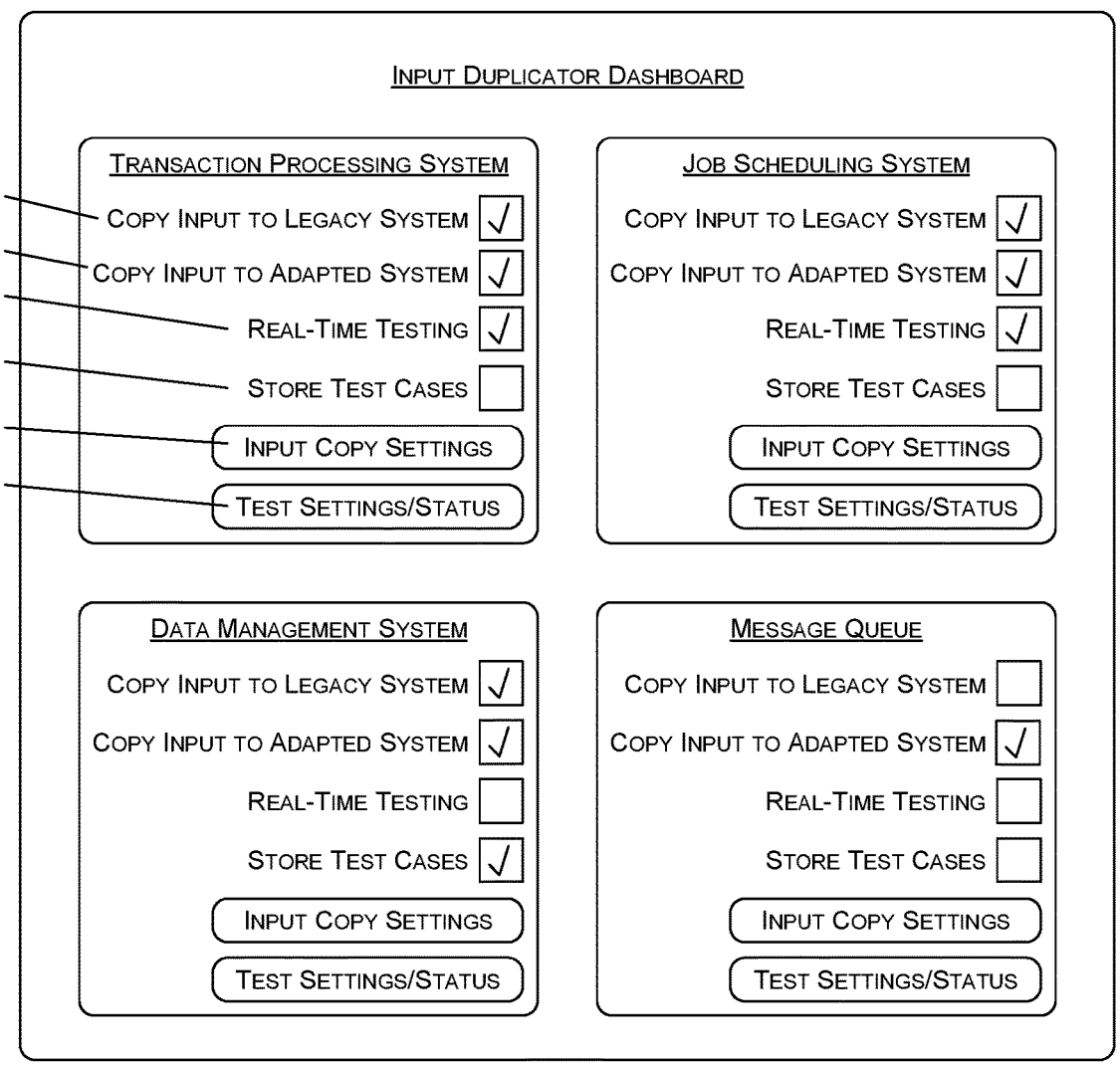
FIG. 2 shows an example of an input duplicator dashboard that can be displayed via a user interface.

FIG. 2 shows an example of an input duplicator dashboard 200, associated with the input duplicator 108, that can be displayed via the user interface 120. As discussed above, users can use the user interface 120 to configure the input duplicator 108. For example, the input duplicator dashboard 200 can include user-selectable options and settings that may indicate whether the input duplicator 108 is to provide copies of some or all types of input 106 to the adapted system 104 and/or to the test data repository 118.

As an example, the input duplicator dashboard 200 can have a first option 202 indicating whether copies of input 106 are to be provided by the input duplicator 108 to the legacy system 102. The input duplicator dashboard 200 can also have a second option 204 indicating whether copies of input 106 are to be provided by the input duplicator 108 to the adapted system 104 in addition to, or instead of, the legacy system 102. The input duplicator dashboard 200 can also have a third option 206 indicating whether the copies of the input 106 are to be used for real-time testing. The input duplicator dashboard 200 can similarly have a fourth option 208 indicating whether the copies of the input 106 are to be used for delayed testing, for instance by storing the copies of the input 106 in the test data repository 118. The input duplicator dashboard 200 can also provide input copy settings 210 that users can use to specify types or subtypes of input 106, amounts of input 106, instances of the adapted system 104 to which input 106 is to be provided, and/or other attributes of input 106 to be copied and/or used for real-time and/or delayed testing. The input duplicator dashboard 200 can also provide test settings and/or status options 212 that allow users to initiate delayed tests based on copies of input 106 stored in the test data repository 118, view test status information associated with comparisons performed by the result comparator 114 as described below with respect to FIG. 3, and/or view or change any other settings or status information.

For example, if a user wants to perform real-time testing or delayed testing by providing copies of input 106 to both the legacy system 102 and the adapted system 104, the user may select both the first option 202 and the second option 204, and a corresponding one of the third option 206 or the fourth option 208. If the user instead does not want to perform testing based on providing input 106 to the adapted system 104, the user may select the first option 202 and not select the second option 204 to cause input 106 to be provided only to the legacy system 102. Similarly, if the user wants to migrate to using the adapted system 104 instead of the legacy system 102, the user may select the second option 204 and not select the first option 202 to cause input 106 to be provided only to the adapted system 104.

The input duplicator dashboard 200 can, in some examples, allow users to select options in association with individual applications or subsystems. For example, as shown in FIG. 2, the input duplicator dashboard 200 can provide separate selectable options, such as different instances of the first option 202, the second option 204, the third option 206, the fourth option 208, the input copy settings 210, and/or the test settings and/or status options 212 for input 106 associated with a transaction processing system, a job scheduling system, a data management system, and a message queue. In other examples, input duplicator dashboard 200 can allow users to select such options globally.

Figure 3:
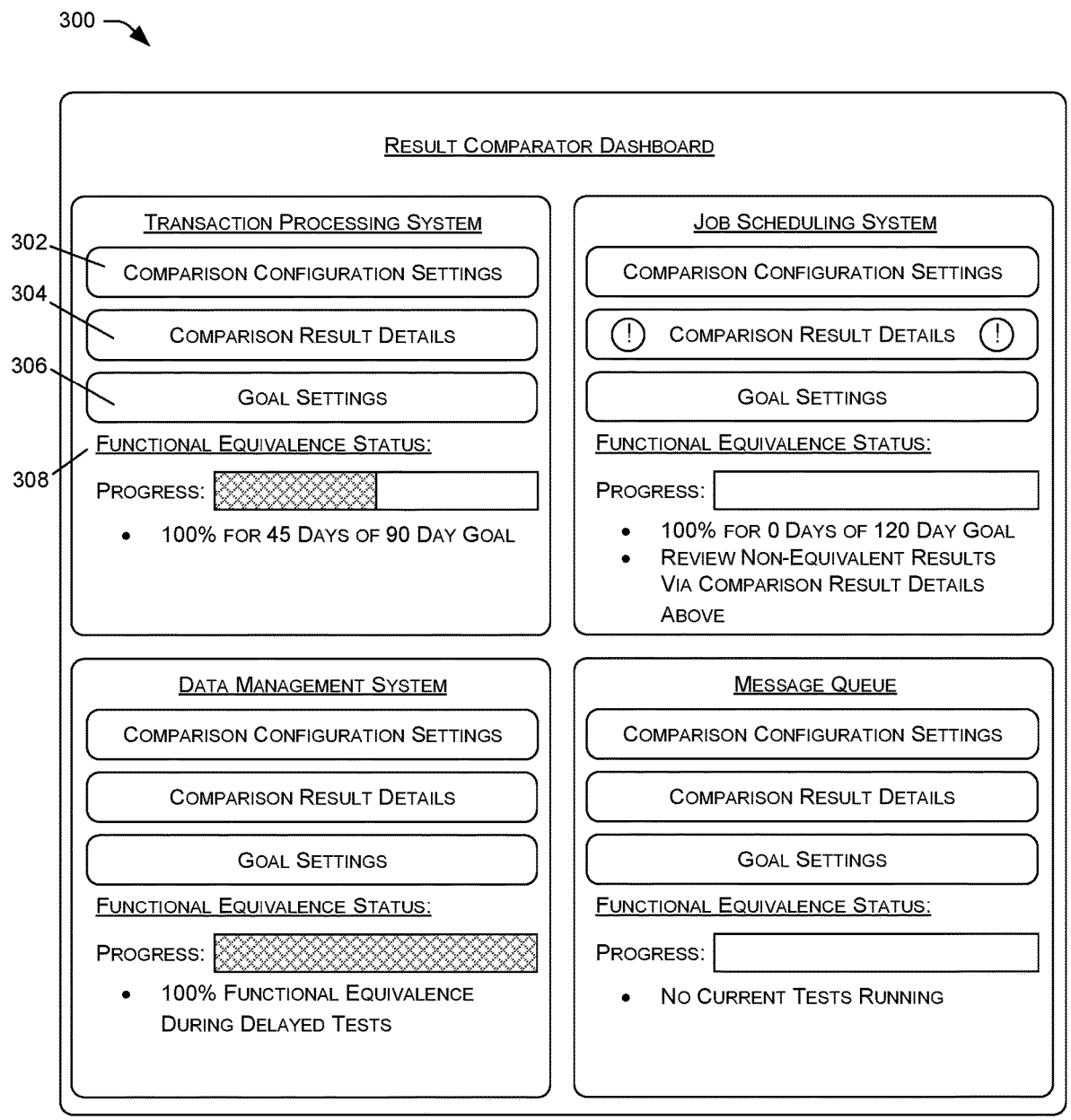
FIG. 3 shows an example of a result comparator dashboard that can be displayed via the user interface.

FIG. 3 shows an example of a result comparator dashboard 300, associated with the result comparator 114, that can be displayed via the user interface 120. As discussed above, users can use the user interface 120 to configure the result comparator 114. For example, the result comparator dashboard 300 can include user-selectable options and settings that may allow users to provide or adjust configuration data that defines when the result comparator 114 can consider legacy system results 110 and corresponding adapted system results 112 to be functionally equivalent. The result comparator dashboard 300 can also display results of comparison operations performed by the result comparator 114 on pairs and/or sets of legacy system results 110 and adapted system results 112 in association with real-time and/or delayed testing, and/or present any other information associated with the result comparator 114.

As an example, the result comparator dashboard 300 can have comparison configuration settings 302 that may allow users to view and/or adjust which fields in legacy system results 110 and adapted system results 112 are to be exact matches for the result comparator 114 to consider the results to be functionally equivalent, which fields can be disregarded during comparison operations, threshold differences and/or other thresholds than can be used by the result comparator 114 to determine whether results are functionally equivalent, and/or other types of configuration settings. The result comparator dashboard 300 can also have a comparison result detail option 304 that allows user to view results of specific comparisons between legacy system results 110 and adapted system results 112, in some examples including allowing users to drill down and view more granular information. For example, if legacy system results 110 and adapted system results 112 were not found to be functionally equivalent, the user may use the comparison result detail option 304 to view those specific legacy system results 110 and adapted system results 112, and/or corresponding input 106, to review why the legacy system results 110 and adapted system results 112 were not found to be functionally equivalent.

The result comparator dashboard 300 can also have goal settings 306 that allow users to view and define migration goals. For example, a user can use the goal settings 306 to indicate that migration from the legacy system 102 to the adapted system 104 can proceed, or can be considered more heavily, if sets of legacy system results 110 and corresponding adapted system results 112 are found by the result comparator 114 to be 100% functionally equivalent over a time period defined by via the goal settings 306. The result comparator dashboard 300 can also have a status section 308 that can indicate progress of real-time and/or delayed testing, such as whether and how long results have been found to be functionally equivalent over a time period relative to a goal set via the goal settings 306, notes about the testing progress and/or errors encountered by the equivalence testing system 100 during the testing progress, and/or any other information. In some examples, the status section 308 may display testing progress relative to a testing goal via a status bar, and change the status bar to green or otherwise indicate testing success if the testing goal is satisfied.

The result comparator dashboard 300 can, in some examples, allow users to view data and select options in association with testing for individual applications or subsystems. For example, as shown in FIG. 3, the result comparator dashboard 300 can display distinct information, and/or separate selectable options, in association with a transaction processing system, a job scheduling system, a data management system, and a message queue. In other examples, result comparator dashboard 300 can display the same or similar information and options globally.

Figure 4:
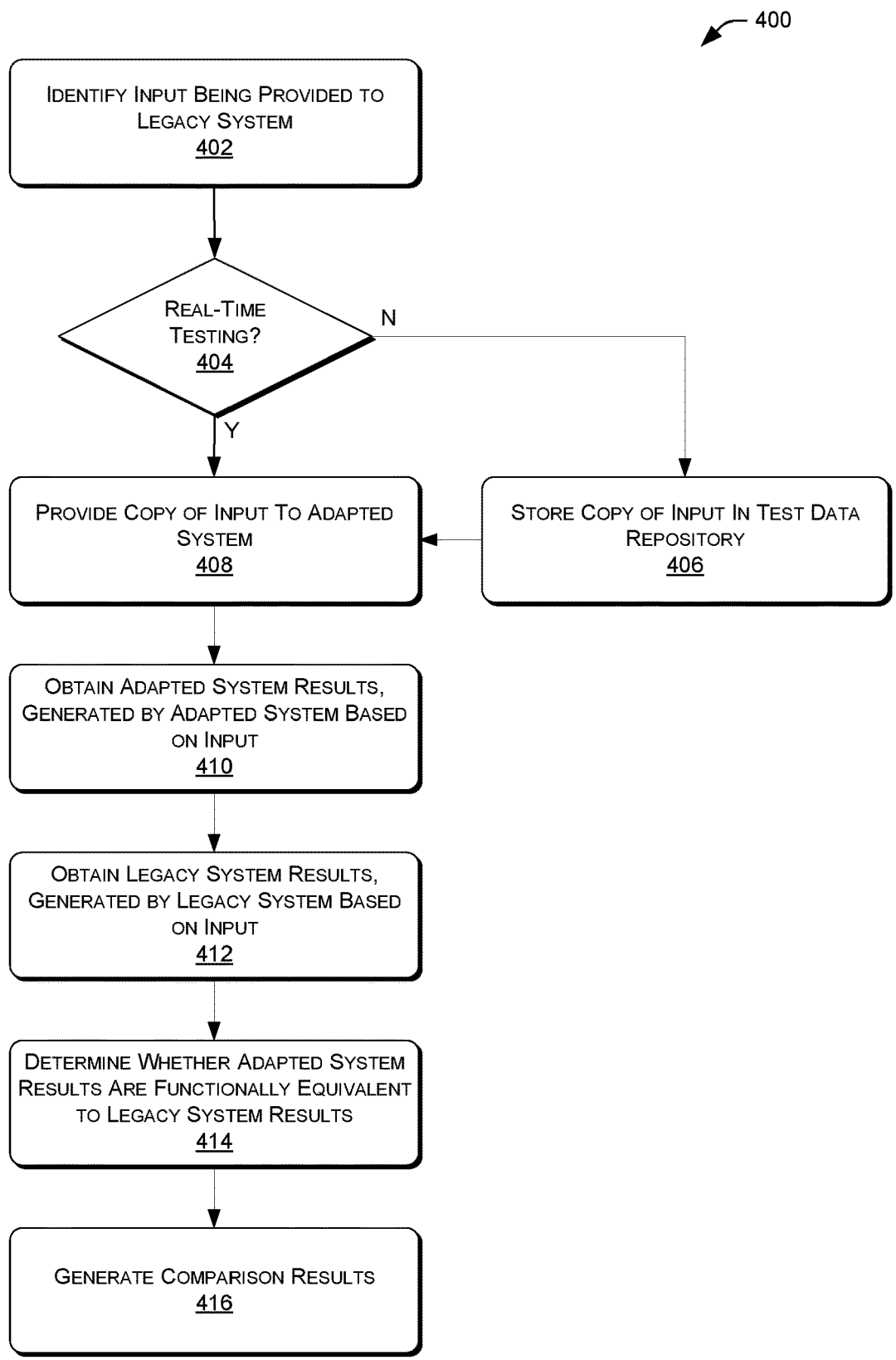
FIG. 4 is a flow diagram of an illustrative process by which the equivalence testing system can perform functional equivalence testing associated with the legacy system and the adapted system.

FIG. 4 is a flow diagram of an illustrative process 400 by which the equivalence testing system 100 can perform functional equivalence testing associated with the legacy system 102 and the adapted system 104. Process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At block 402, the equivalence testing system 100 can identify input 106 being provided to the legacy system 102 by a client. In some examples, the equivalence testing system 100 can intercept the input 106 prior to the legacy system 102 receiving the input 106. In other examples, the input 106 can already have been received by the legacy system 102, and the equivalence testing system 100 can access the input 106 from the legacy system 102.

At block 404, the equivalence testing system 100 can determine whether the input 106 identified at block 402 is associated with real-time testing. For example, configuration data associated with the input duplicator 108 may indicate, based on a type of the input 106 or a corresponding application or subsystem configured to process that type of input 106, that the input 106 is associated with real-time testing or is to be stored in the test data repository 118 for later delayed testing.

If the input 106 is not associated with real-time testing (Block 404—No), the equivalence testing system 100 can store a copy of the input 106 in the test data repository 118 at block 406. If the legacy system 102 has not already received a copy of the input 106, the equivalence testing system 100 can also provide a copy of the input 106 to the legacy system 102 in addition to storing a copy of the input 106 in the test data repository 118.

At block 408, the equivalence testing system 100 can provide a copy of the input 106 to the adapted system 104. If the input 106 was associated with real-time testing (Block 404—Yes), the equivalence testing system 100 can provide the copy of the input 106 to the adapted system 104 substantially immediately after identifying the input 106 at block 402. For example, the equivalence testing system 100 can provide the copy of the input 106 to the adapted system 104 within a threshold amount of time after identifying the input 106. However, if the input 106 was associated with delayed testing and was instead stored in the test data repository 118 at block 406, the equivalence testing system 100 can provide the copy of the input 106 to the adapted system 104 at a later point in time at block 408, for example in response to user input received via the user interface 120 indicating that a delayed test associated with the copy of the input 106 is to be executed.

At block 410, the equivalence testing system 100 can obtain adapted system results 112 generated by the adapted system 104 based on the input 106 provided to the adapted system 104 at block 408. At block 412, the equivalence testing system 100 can similarly obtain legacy system results 110 generated by the legacy system 102 based on the same input 106.

If the input 106 was associated with real-time testing, the legacy system 102 and the adapted system 104 may receive copies of the input 106 at substantially the same time, for instance within a threshold period of time from one another, and may respectively produce legacy system results 110 and adapted system results 112 based on copies of the same input 106 at or near the same time. Accordingly, at block 410 and block 412 the equivalence testing system 100 may obtain the adapted system results 112 and the legacy system results 110 at substantially the same time, for instance within a threshold period of time from one another.

If the input 106 was instead associated with delayed testing, the legacy system 102 may have received a copy of the input 106 earlier than the adapted system 104. Accordingly, the legacy system 102 may have produced legacy system results 110 at an earlier time, before a copy of the input 106 was provided to the adapted system 104 at block 408 and/or the adapted system 104 produces the adapted system results 112 based on the input 106. However, the equivalence testing system 100 may have obtained the legacy system results 110 at the earlier time, and stored the legacy system results 110 in the test data repository 118 or another storage location at least until the equivalence testing system 100 obtains the corresponding adapted system results 112 associated with the same input 106 at block 410. The equivalence testing system 100 can accordingly retrieve such stored legacy system results 110 at block 412.

At block 414, the equivalence testing system 100 can determine whether the adapted system results 112 obtained at block 410 are functionally equivalent to the legacy system results 110 obtained at block 412. As described above, configuration data associated with the result comparator 114 can indicate a definition of functionally equivalent results, for instance by indicating types of fields or data elements of the legacy system results 110 and the adapted system results 112 are to fully match, can be disregarded during comparisons, or can vary by up to threshold tolerance levels, in order for the result comparator 114 to determine that the legacy system results 110 and the adapted system results 112 are functionally equivalent. Accordingly, at block 414, the result comparator 114 of the equivalence testing system 100 can use such configuration data to determine whether the adapted system results 112 are functionally equivalent to the legacy system results 110.

At block 416, the equivalence testing system 100 can generate comparison results indicating whether the adapted system results 112 were determined at block 416 to be functionally equivalent to the legacy system results 110. For example, if the adapted system results 112 were determined to be functionally equivalent to the legacy system results 110, the equivalence testing system 100 can generate comparison results indicating that the adapted system results 112 and the legacy system results 110 are functionally equivalent. However, if the adapted system results 112 were not determined to be functionally equivalent to the legacy system results 110, the equivalence testing system 100 can generate comparison results indicating that the adapted system results 112 and the legacy system results 110 are not functionally equivalent.

In some examples, the comparison results generated at block 416 can be displayed via the user interface 120, for instance via the result comparator dashboard 300 discussed above with respect to FIG. 3. In other examples, the comparison results generated at block 416 can be used to update functional equivalence testing metrics associated with a period of time, and/or sets of legacy system results 110 and corresponding adapted system results 112.

Figure 5:
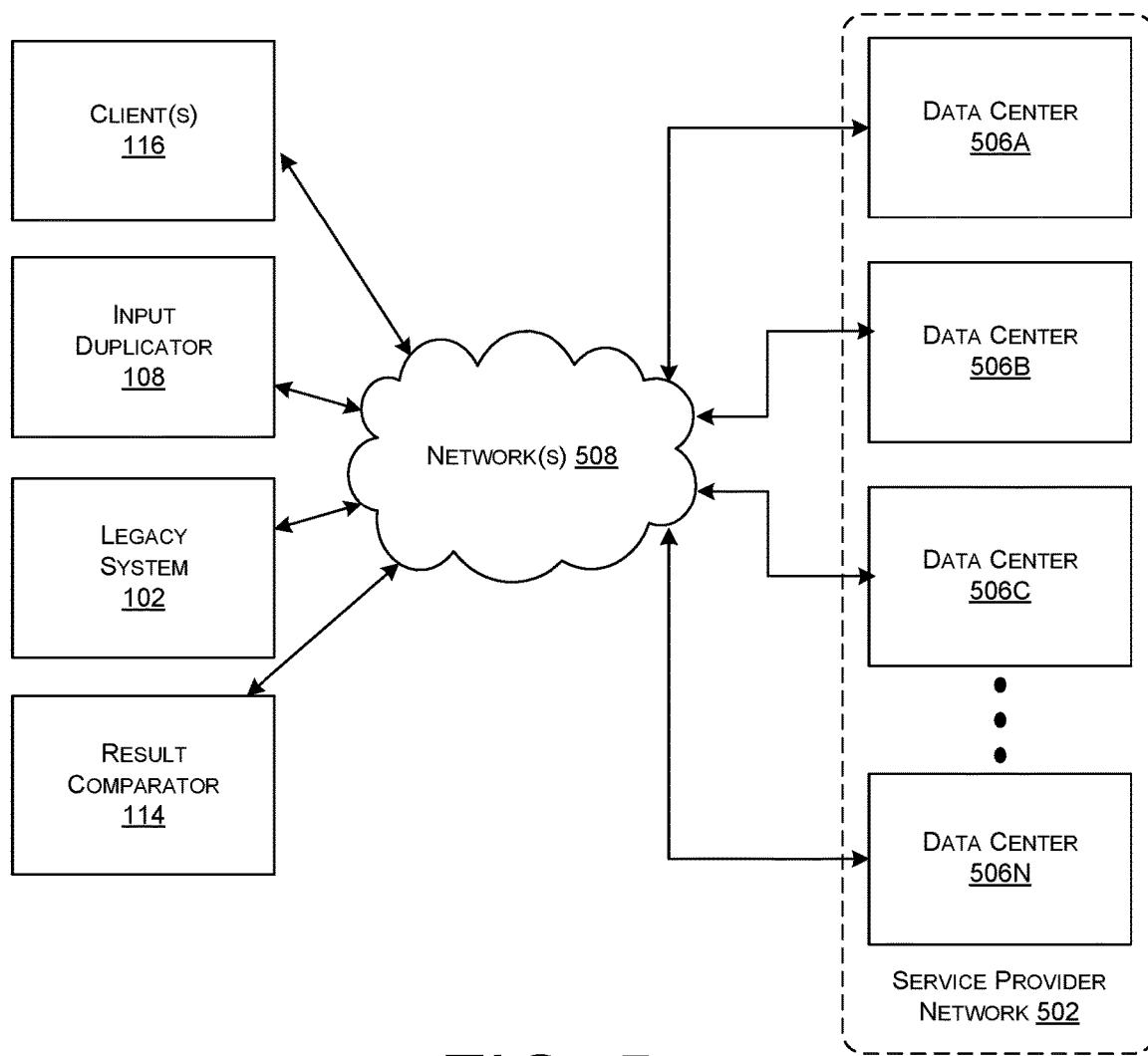
FIG. 5 is a system and network diagram that shows an illustrative operating environment for the configurations disclosed herein.

FIG. 5 is a system and network diagram that shows an illustrative operating environment 500 for the configurations disclosed herein, which includes a service provider network 502 that can be configured to perform techniques disclosed herein. In some examples, the service provider network 502 can be an example of the cloud computing environment described above. Elements of the service provider network 502 can execute various types of computing and network services, such as data storage and data processing, and/or provide computing resources for various types of systems on a permanent or an as-needed basis. For example, among other types of functionality, the computing resources provided by the service provider network 502 may be utilized to implement various services described above such as, for example, services provided and/or used by the adapted system 104, the test data repository 118, the result comparator 114, the user interface 120, the recommendation engine 122, the insight engine 124, the performance determiner 126, and/or other elements described herein. Additionally, the operating environment can provide computing resources that include, without limitation, data storage resources, data processing resources, such as virtual machine (VM) instances, networking resources, data communication resources, network services, and other types of resources.

Each type of computing resource provided by the service provider network 502 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 502 can also be configured to provide other types of computing resources not mentioned specifically herein.

The computing resources provided by the service provider network 502 may be enabled in one embodiment by one or more data centers 506A-506N (which might be referred to herein singularly as "a data center 506" or in the plural as "the data centers 506"). The data centers 506 are facilities utilized to house and operate computer systems and associated components. The data centers 506 typically include redundant and backup power, communications, cooling, and security systems. The data centers 506 can also be located in geographically disparate locations. One illustrative embodiment for a data center 506 that can be utilized to implement the technologies disclosed herein will be described below with regard to FIG. 6.

The data centers 506 may be configured in different arrangements depending on the service provider network 502. For example, one or more data centers 506 may be included in, or otherwise make-up, an availability zone. Further, one or more availability zones may make-up or be included in a region. Thus, the service provider network 502 may comprise one or more availability zones, one or more regions, and so forth. The regions may be based on geographic areas, such as being located within a predetermined geographic perimeter.

Users and/or owners of the service provider network 502 may access the computing resources provided by the service provider network 502 over any wired and/or wireless network(s) 508, which can be a wide area communication network ("WAN"), such as the Internet, an intranet or an Internet service provider ("ISP") network or a combination of such networks. For example, and without limitation, a computing device, e.g., a computing device associated with the input duplicator 108 or the result comparator 114, can be utilized to access the service provider network 502 by way of the network(s) 508. Other elements described herein can also interact via the network(s) 508. For example, clients 116 can provide input 106 to the legacy system 102 via the network(s) 508, such that the input duplicator 108 can access or intercept the input 106 via the networks(s) 508. It should be appreciated that a local-area network ("LAN"), the Internet, or any other networking topology known in the art that connects the data centers 506 to remote customers and other users can be utilized. It should also be appreciated that combinations of such networks can also be utilized.

Each of the data centers 506 may include computing devices that include software, such as applications that receive and transmit data. The data centers 506 can also include databases, data stores, or other data repositories that store and/or provide data. For example, data centers 506 can store data associated with the adapted system 104, the test data repository 118, one or more elements of the equivalence testing system 100, and/or other elements described herein.

Figure 6:
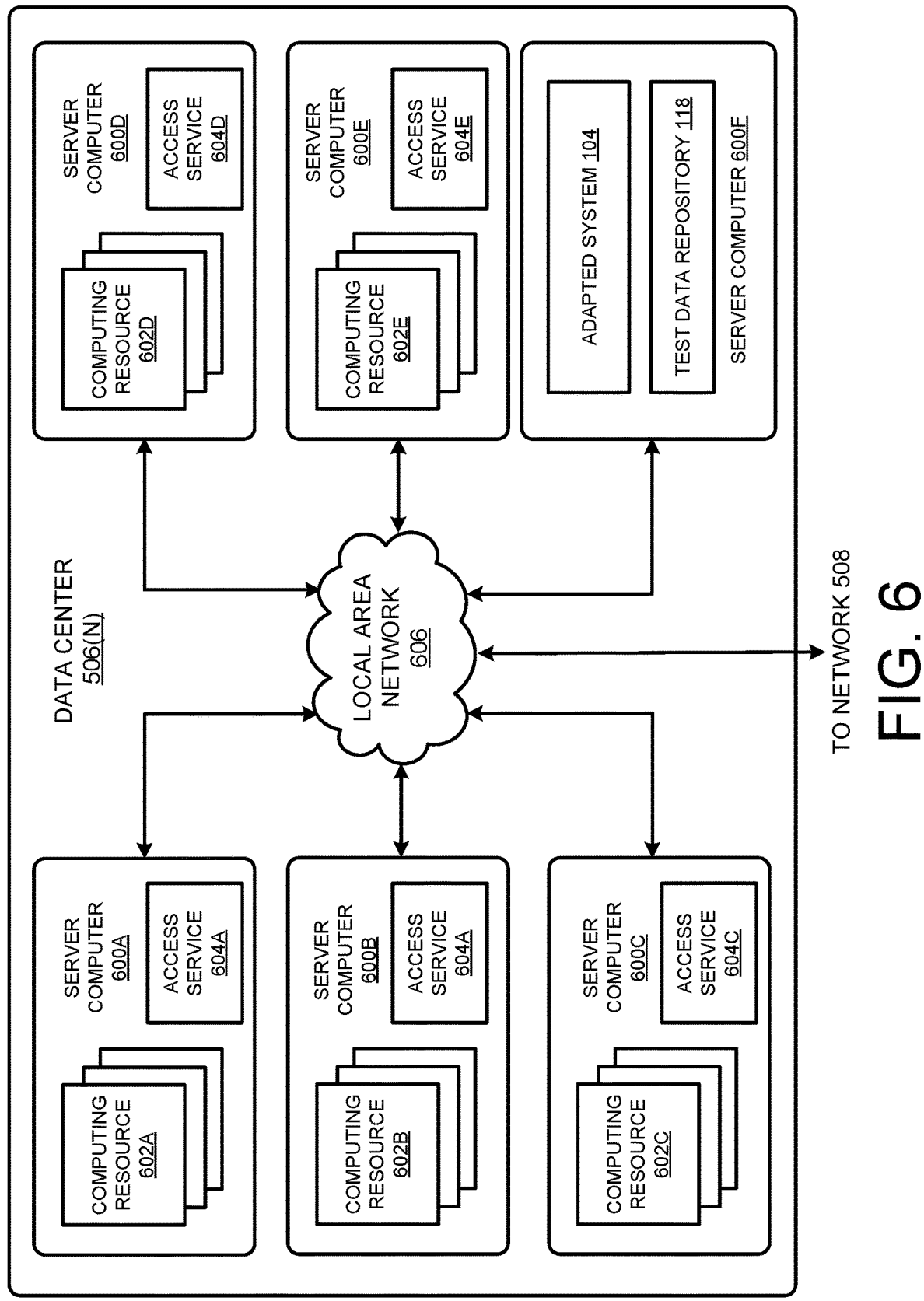
FIG. 6 is a computing system diagram that illustrates one configuration for a data center that can be utilized to implement the adapted system and/or the equivalence testing system.

FIG. 6 is a computing system diagram that illustrates one configuration for a data center 506(N) that can be utilized to implement the adapted system 104 and/or the equivalence testing system 100, as described above in FIGS. 1-5. The example data center 506(N) shown in FIG. 6 includes several server computers 600A-600E (collectively 600) for providing computing resources 602A-602E (collectively 602), respectively.

The server computers 600 can be standard tower, rack-mount, or blade server computers configured appropriately for providing the various computing resources (illustrated in FIG. 6 as the computing resources 602A-602E). The computing resources 602 can include, without limitation, analytics applications, data storage resources, data processing resources such as VM instances or hardware computing systems, database resources, networking resources, and others. Some of the servers 600 can also be configured to execute access services 604A-604E (collectively 604) capable of instantiating, providing and/or managing the computing resources 602, some of which are described in detail herein.

The data center 506(N) shown in FIG. 6 also includes a server computer 600F that can execute any or all of the software components described above. For example, and without limitation, the server computer 600F can be configured to execute the adapted system 104 and/or the test data repository 118. In other examples, the server computer 600F can also, or alternately, be configured to execute one or more elements of the equivalence testing system 100, such as the result comparator 114, the user interface 120, and/or other elements of the equivalence testing system 100. The server computer 600F can also be configured to execute other components and/or to store data for providing some or all of the functionality described herein. In this regard, it should be appreciated that components of the adapted system 104 and/or the equivalence testing system 100 described herein can execute on many other physical or virtual servers in the data centers 506 in various configurations.

In the example data center 506(N) shown in FIG. 6, an appropriate LAN 606 is also utilized to interconnect the server computers 600A-600F. The LAN 606 is also connected to the network 508 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 506(1)-(N), between each of the server computers 600A-600F in each data center 506, and, potentially, between computing resources 602 in each of the data centers 506. It should be appreciated that the configuration of the data center 506 described with reference to FIG. 6 is merely illustrative and that other implementations can be utilized.

Figure 7:
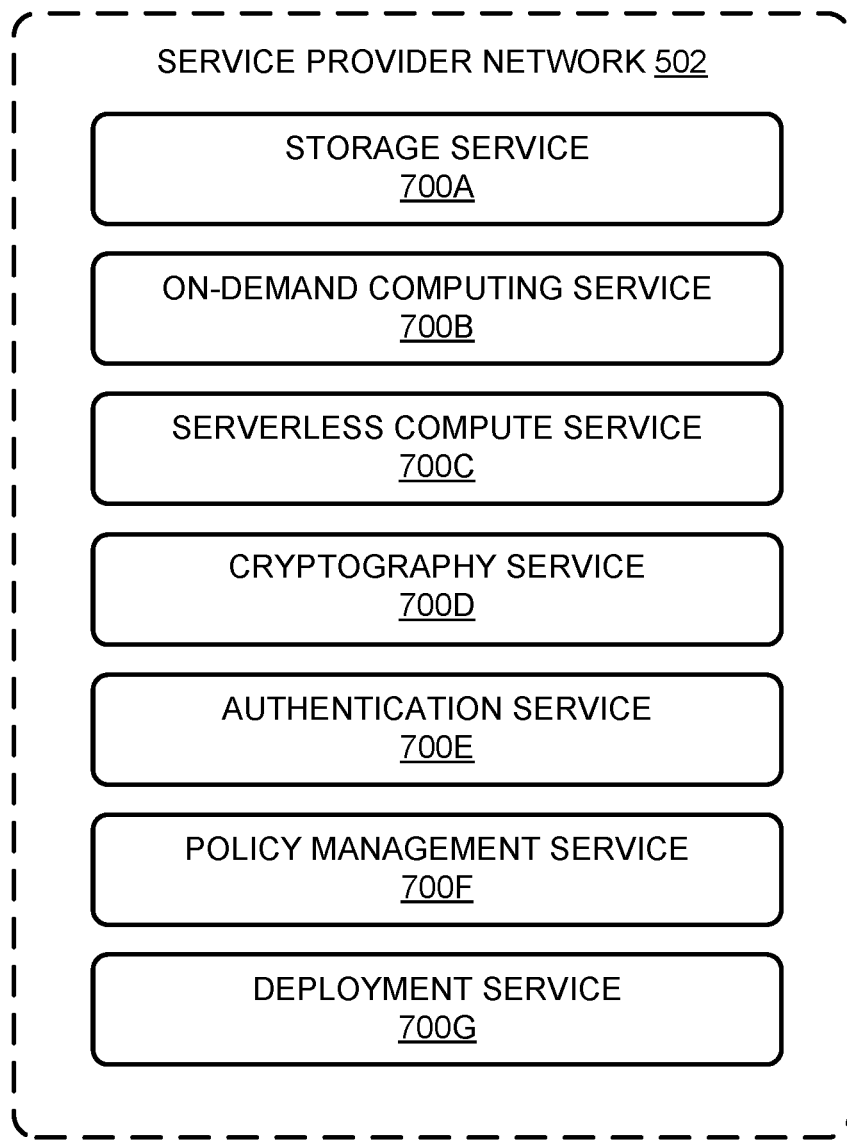
FIG. 7 is a system services diagram that shows aspects of several services that can be provided by and utilized within a service provider network.

FIG. 7 is a system services diagram that shows aspects of several services that can be provided by and utilized within the service provider network 502, which can be configured to implement the various technologies disclosed herein. The service provider network 502 can provide a variety of services to users including, but not limited to, the adapted system 104, the test data repository 118, one or more elements of the equivalence testing system 100, a storage service 700A, an on-demand computing service 700B, a serverless compute service 700C, a cryptography service 700D, an authentication service 700E, a policy management service 700F, and a deployment service 700G. The service provider network 502 can also provide other types of computing services, some of which are described below.

It is also noted that not all configurations described include the services shown in FIG. 7 and that additional services can be provided in addition to, or as an alternative to, the services explicitly described herein. Each of the systems and services shown in FIG. 7 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 7 will now be provided.

The storage service 700A can be a network-based storage service that stores data obtained from users of the service provider network 502 and/or from computing resources in the service provider network 502. The data stored by the storage service 700A can be obtained from computing devices of users. The data stored by the storage service 700A may also include data associated with the adapted system 104, the test data repository 118, the equivalence testing system 100, and/or other elements described herein.

The on-demand computing service 700B can be a collection of computing resources configured to instantiate VM instances and to provide other types of computing resources on demand. For example, a user of the service provider network 502 can interact with the on-demand computing service 700B (via appropriately configured and authenticated API calls, for example) to provision and operate VM instances that are instantiated on physical computing devices hosted and operated by the service provider network 502. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 700B is shown in FIG. 7, any other computer system or computer system service can be utilized in the service provider network 502 to implement the functionality disclosed herein, such as a computer system or computer system service that does not employ virtualization and instead provisions computing resources on dedicated or shared computers/servers and/or other physical devices.

The serverless compute service 700C is a network service that allows users to execute code (which might be referred to herein as a "function") without provisioning or managing server computers in the service provider network 502. Rather, the serverless compute service 700C can automatically run code in response to the occurrence of events. The code that is executed can be stored by the storage service 700A or in another network accessible location.

In this regard, it is to be appreciated that the term "serverless compute service" as used herein is not intended to infer that servers are not utilized to execute the program code, but rather that the serverless compute service 700C enables code to be executed without requiring a user to provision or manage server computers. The serverless compute service 700C executes program code only when needed, and only utilizes the resources necessary to execute the code. In some configurations, the user or entity requesting execution of the code might be charged only for the amount of time required for each execution of their program code.

The service provider network 502 can also include a cryptography service 700D. The cryptography service 700D can utilize storage services of the service provider network 502, such as the storage service 700A, to store encryption keys in encrypted form, whereby the keys can be usable to decrypt user keys accessible only to particular devices of the cryptography service 700D. The cryptography service 700D can also provide other types of functionality not specifically mentioned herein.

The service provider network 502, in various configurations, also includes an authentication service 700E and a policy management service 700F. The authentication service 700E, in one example, is a computer system (i.e., collection of computing resources) configured to perform operations involved in authentication of users or customers. For instance, one of the services shown in FIG. 7 can provide information from a user or customer to the authentication service 700E to receive information in return that indicates whether or not the requests submitted by the user or the customer are authentic.

The policy management service 700F, in one example, is a network service configured to manage policies on behalf of users or customers of the service provider network 502. The policy management service 700F can include an interface (e.g. API or GUI) that enables customers to submit requests related to the management of a policy, such as a security policy. Such requests can, for instance, be requests to add, delete, change, or otherwise modify policy for a customer, service, or system, or for other administrative actions, such as providing an inventory of existing policies and the like.

The service provider network 502 can additionally maintain other network services based, at least in part, on the needs of its customers. For instance, the service provider network 502 can maintain a deployment service 700G for deploying program code in some configurations. The deployment service 700G provides functionality for deploying program code, such as to virtual or physical hosts provided by the on-demand computing service 700B. Other services include, but are not limited to, database services, object-level archival data storage services, and services that manage, monitor, interact with, or support other services. The service provider network 502 can also be configured with other network services not specifically mentioned herein in other configurations.

Figure 8:
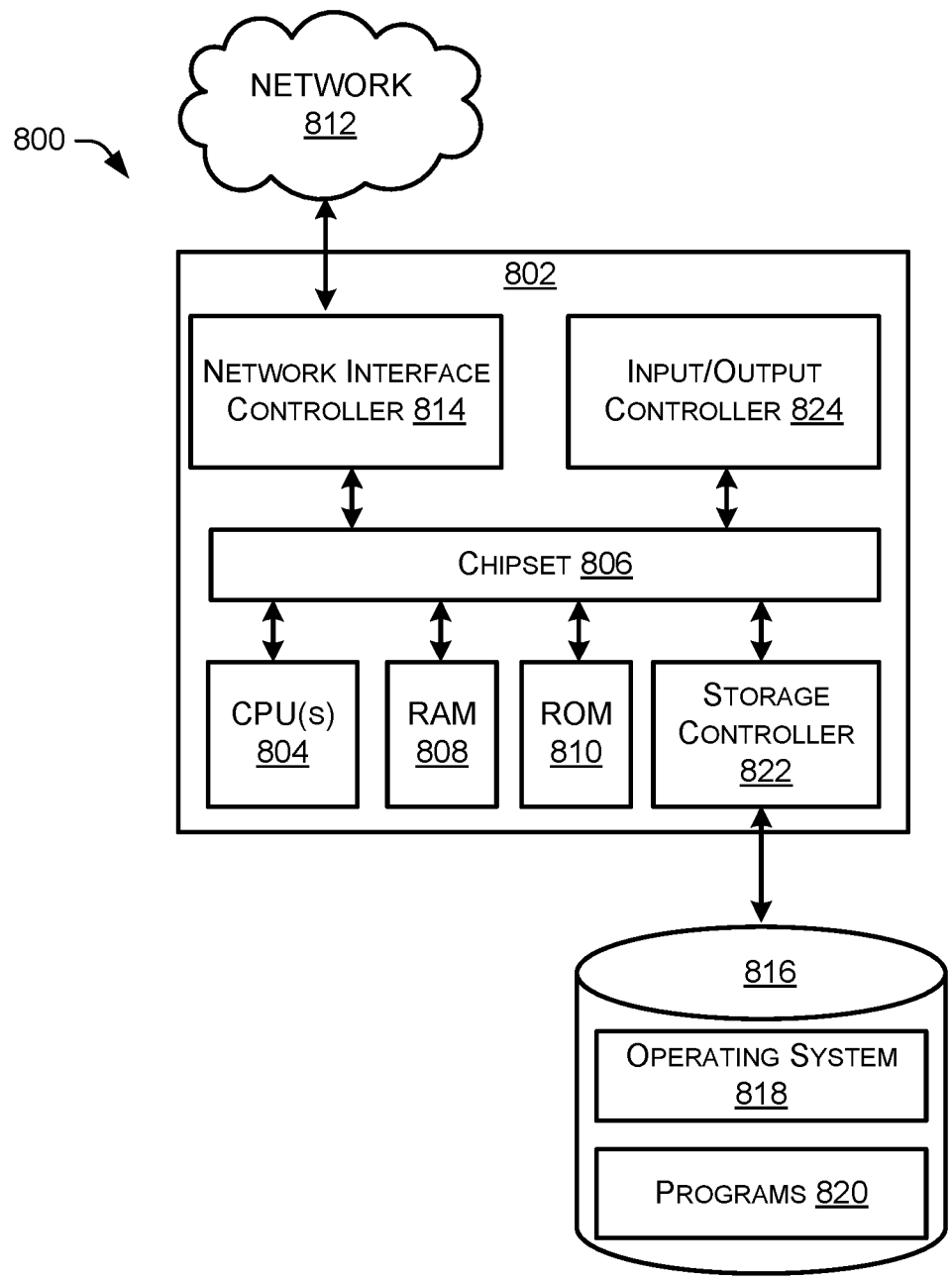
FIG. 8 shows an example computer architecture for a computer capable of executing program components for implementing functionality described herein.

FIG. 8 shows an example computer architecture for a computer 800 capable of executing program components for implementing functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. For instance, in some examples, the computer 800 may be associated with the legacy system 102 or the adapted system 104 described above, and/or may execute one or more elements of the equivalence testing system 100.

The computer 800 includes a baseboard 802, or "motherboard," which may be one or more printed circuit boards to which a multitude of components and/or devices may be connected by way of a system bus and/or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 812. The chipset 806 can include functionality for providing network connectivity through a NIC 814, such as a gigabit Ethernet adapter. The NIC 814 is capable of connecting the computer 800 to other computing devices over the network 812. It should be appreciated that multiple NICs 814 can be present in the computer 800, connecting the computer to other types of networks and remote computer systems.

The computer 800 can be connected to a mass storage device 816 that provides non-volatile storage for the computer. The mass storage device 816 can store an operating system 818, programs 820, and data, which have been described in greater detail herein. The mass storage device 816 can be connected to the computer 800 through a storage controller 822 connected to the chipset 806. The mass storage device 816 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 816 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 816 is characterized as primary or secondary storage, and the like.

For example, the computer 800 can store information to the mass storage device 816 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 816 by detecting the physical states or characteristics of one or more particular locations within the physical storage units.

In addition to the mass storage device 816 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 816 can store an operating system 818 utilized to control the operation of the computer 800. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 816 can store other system or application programs and data utilized by the computer 800.

In one configuration, the mass storage device 816 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above. The computer 800 can also include computer-readable storage media for performing any of the other computer-implemented operations described herein.

The computer 800 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for testing the functional equivalence of the legacy system 102 and the adapted system 104 have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
    identifying, by an equivalence testing system, input provided to a legacy mainframe system by one or more clients;
    providing, by the equivalence testing system, a copy of the input to an adapted system that is intended to be functionally equivalent to the legacy mainframe system such that the legacy mainframe system and the adapted system are to produce a functionally equivalent output in response to receiving a same input, wherein:
        the adapted system is a version of the legacy mainframe system that executes in a cloud computing environment; and
        an entity associated with the legacy mainframe system is considering migrating operations from the legacy mainframe system to the adapted system;
    obtaining, by the equivalence testing system and prior to the operations being migrated from the legacy mainframe system to the adapted system, adapted system results produced by the adapted system based on the copy of the input;
    obtaining, by the equivalence testing system and prior to the operations being migrated from the legacy mainframe system to the adapted system, legacy system results produced by the legacy mainframe system based on the input;
    determining, by the equivalence testing system and prior to the operations being migrated from the legacy mainframe system to the adapted system, whether the adapted system results are functionally equivalent to the legacy system results, based on configuration data indicating a definition of functionally equivalent results; and
    one of:
        in response to determining that the adapted system results are functionally equivalent to the legacy system results, causing the operations to be migrated from the legacy mainframe system to the adapted system; or
        in response to determining that the adapted system results are not functionally equivalent to the legacy system results, refraining from migrating the operations from the legacy mainframe system to the adapted system.

2. The method of claim 1, wherein providing the copy of the input to the adapted system comprises providing, by the equivalence testing system, the copy of the input to the adapted system via a network within a threshold period of time after identifying the input.

3. The method of claim 1, wherein providing the copy of the input to the adapted system comprises:
    storing, by the equivalence testing system, the copy of the input in a test data repository at a first time; and
    providing, by the equivalence testing system, the copy of the input, from the test data repository, to the adapted system at a second time, in response to initiation of a delayed test associated with the input.

4. The method of claim 1, wherein:
    the configuration data identifies one or more data elements, of the legacy system results and the adapted system results, that are permitted to vary between functionally equivalent results, and
    the one or more data elements that are permitted to vary include at least one of:
        timestamp fields, or
        particular fields associated with corresponding threshold tolerance levels, the particular fields being permitted to vary based on differences between values of the particular fields being less than or equal to the corresponding threshold tolerance levels.

5. A method comprising:
    identifying, by an equivalence testing system, input provided to a legacy system by one or more clients;
    sending, by the equivalence testing system, a copy of the input to an adapted system, the adapted system being a version of the legacy system that executes in a different computing environment than the legacy system and that is intended to be functionally equivalent to the legacy system such that the legacy system and the adapted system are to produce a functionally equivalent output based on a same input;
    determining, by the equivalence testing system, adapted system results produced by the adapted system based at least in part on the copy of the input;
    determining, by the equivalence testing system, legacy system results produced by the legacy system based at least in part on the input; and
    determining, by the equivalence testing system, whether the adapted system results are functionally equivalent to the legacy system results.

6. The method of claim 5, wherein sending the copy of the input to the adapted system comprises sending, by the equivalence testing system, the copy of the input to the adapted system within a threshold period of time after identifying the input.

7. The method of claim 5, wherein sending the copy of the input to the adapted system comprises:

storing, by the equivalence testing system, the copy of the input in a test data repository at a first time; and sending, by the equivalence testing system, the copy of the input, from the test data repository, to the adapted system at a second time, in response to initiation of a delayed test associated with the input.

8. The method of claim 5, wherein configuration data associated with the equivalence testing system identifies one or more data elements, of the legacy system results and the adapted system results, that are permitted to vary between functionally equivalent results.

9. The method of claim 8, wherein the configuration data defines allowable threshold tolerance levels associated with differences between the one or more data elements.

10. The method of claim 5, wherein:

the legacy system and the adapted system are associated with a plurality of applications, the method further comprises identifying, by the equivalence testing system, an application, of the plurality of applications, associated with the input, and the equivalence testing system sends the copy of the input to the adapted system in at least one of a real-time or a delayed basis based at least in part on configuration data associated with the application.

11. The method of claim 10, wherein the plurality of applications includes two or more of:

a transaction processing system,
a job scheduling system,
a data management system,
a message queue,
a File Transfer Protocol (FTP) system,
an email system,
an output manager system,
a web service system,
a Transmission Control Protocol/Internet Protocol (TCP/IP) system, or
an Application Programming Interface (API).

12. The method of claim 5, wherein the adapted system executes in the different computing environment as an emulated version of the legacy system.

13. The method of claim 5, wherein the adapted system executes in the different computing environment based at least in part on refactored code generated from original code of the legacy system.

14. The method of claim 5, further comprising displaying, by the equivalence testing system, and in a user interface, comparison results indicating whether the adapted system results are functionally equivalent to the legacy system results.

15. The method of claim 14, wherein:

the comparison results are presented in the user interface in association with a set of comparison results generated over a period of time, and the set of comparison results are generated by the equivalence testing system over the period of time based at least in part on comparisons, by the equivalence testing system, of additional adapted system results and corresponding additional legacy system results associated with additional input.

16. One or more non-transitory computer-readable media storing computer-executable instructions associated with an equivalence testing system that, when executed by one or more processors, cause the one or more processors to perform operations comprising:

identifying input provided to a legacy system by one or more clients;

sending a copy of the input to an adapted system, the adapted system being a version of the legacy system that executes in a different computing environment than the legacy system;

determining adapted system results produced by the adapted system based at least in part on the copy of the input;

determining legacy system results produced by the legacy system based at least in part on the input; and determining, prior to migration of at least one of operations or data maintained by the legacy system to the adapted system, whether the adapted system results are functionally equivalent to the legacy system results.

17. The one or more non-transitory computer-readable media of claim 16, wherein:

identifying the input comprises intercepting the input in a communication path between the one or more clients and the legacy system, and the operations further comprise forwarding a second copy of the input to the legacy system.

18. The one or more non-transitory computer-readable media of claim 16, wherein sending the copy of the input to the adapted system comprises sending the copy of the input to the adapted system within a threshold period of time after identifying the input.

19. The one or more non-transitory computer-readable media of claim 16, wherein sending the copy of the input to the adapted system comprises:

storing the copy of the input in a test data repository at a first time; and sending the copy of the input, from the test data repository, to the adapted system at a second time, in response to initiation of a delayed test associated with the input.

20. The one or more non-transitory computer-readable media of claim 16, wherein the adapted system that produces the adapted system results is a test instance of the adapted system, and the operations further comprise:

determining that the adapted system results are functionally equivalent to the legacy system results; and migrating from the legacy system to the adapted system, in response to determining that the adapted system results are functionally equivalent to the legacy system results, by causing subsequent input to be provided to a production instance of the adapted system.

* * * * *